(12) United States Patent
YangGong et al.

(10) Patent No.: US 10,656,700 B2
(45) Date of Patent: May 19, 2020

(54) POWER MANAGEMENT IN AN INTEGRATED CIRCUIT

(71) Applicant: Oracle International Corporation, Redwood City, CA (US)

(72) Inventors: Yifan YangGong, Milpitas, CA (US); Sebastian Turullols, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 15/645,528

(22) Filed: Jul. 10, 2017

(65) Prior Publication Data

US 2019/0011971 A1    Jan. 10, 2019

(51) Int. Cl.
| | |
|---|---|
| *G06F 1/324* | (2019.01) |
| *G06F 1/3287* | (2019.01) |
| *G06F 1/3296* | (2019.01) |
| *G06F 1/3206* | (2019.01) |
| *G06F 1/20* | (2006.01) |

(52) U.S. Cl.
CPC .............. *G06F 1/324* (2013.01); *G06F 1/206* (2013.01); *G06F 1/3206* (2013.01); *G06F 1/3287* (2013.01); *G06F 1/3296* (2013.01)

(58) Field of Classification Search
CPC ....... G06F 1/324; G06F 1/3287; G06F 1/3296
USPC ................. 713/323, 322, 300, 501
See application file for complete search history.

(56) References Cited

U.S. PATENT DOCUMENTS

| | | | | |
|---|---|---|---|---|
| 5,708,965 | A * | 1/1998 | Courtney | H04B 7/18539 455/13.4 |
| 6,795,927 | B1 | 9/2004 | Altmejd | |
| 7,549,069 | B2 * | 6/2009 | Ishihara | G06F 17/5022 703/13 |
| 8,276,009 | B2 | 9/2012 | King | |
| 9,116,897 | B2 * | 8/2015 | Rowan | G06F 11/3006 |
| 9,128,704 | B2 * | 9/2015 | Kato | G06F 1/20 |
| 9,372,526 | B2 | 6/2016 | Bodas | |
| 9,495,187 | B2 * | 11/2016 | Bingham | G06F 9/45533 |
| 9,568,982 | B1 | 2/2017 | Allen-Ware | |
| 10,355,946 | B1 * | 7/2019 | Dolas | H04L 43/04 |
| 10,417,054 | B2 * | 9/2019 | Andrus | G06F 1/329 |
| 2007/0245163 | A1 * | 10/2007 | Lu | G06F 1/3203 713/300 |
| 2008/0005599 | A1 * | 1/2008 | Theocharous | G06F 1/3203 713/300 |
| 2010/0250998 | A1 * | 9/2010 | Herdrich | G06F 1/3203 713/501 |
| 2013/0275781 | A1 * | 10/2013 | Ramage | G06F 1/3275 713/300 |
| 2014/0068284 | A1 * | 3/2014 | Bhandaru | G06F 1/26 713/300 |

(Continued)

*Primary Examiner* — Aurel Prifti
(74) *Attorney, Agent, or Firm* — Kowert, Hood, Munyon, Rankin & Goetzel, P.C.

(57) ABSTRACT

A power management controller is disclosed. Broadly speaking, the controller may, in response to detecting a timing signal, determine a total power consumption for a plurality of processor clusters, each of which includes a plurality of processor cores. The controller may determine a performance metric using the total power consumption and compare the performance metric to a limit. Based on a result of the comparison, the controller may select a new power state for at least one of the processor clusters.

20 Claims, 9 Drawing Sheets

(56) References Cited

U.S. PATENT DOCUMENTS

| | | | | |
|---|---|---|---|---|
| 2014/0089688 A1* | 3/2014 | Man | G06F 1/3206 | 713/300 |
| 2014/0095909 A1* | 4/2014 | Turullols | G06F 1/10 | 713/322 |
| 2014/0136858 A1* | 5/2014 | Jacobson | G06F 9/46 | 713/300 |
| 2014/0143558 A1* | 5/2014 | Kuesel | G06F 1/26 | 713/300 |
| 2014/0181554 A1* | 6/2014 | Manne | G06F 1/3234 | 713/323 |
| 2014/0189399 A1* | 7/2014 | Govindaraju | G06F 1/324 | 713/323 |
| 2014/0324245 A1* | 10/2014 | Kwon | G06F 1/203 | 700/299 |
| 2014/0380072 A1* | 12/2014 | Lee | G06F 9/5094 | 713/322 |
| 2015/0006924 A1* | 1/2015 | Jain | G06F 1/3203 | 713/320 |
| 2015/0033045 A1* | 1/2015 | Raghuvanshi | G06F 1/3234 | 713/320 |
| 2015/0067356 A1* | 3/2015 | Trichy Ravi | G06F 1/324 | 713/300 |
| 2015/0082060 A1* | 3/2015 | Persson | G06F 1/3203 | 713/322 |
| 2015/0089254 A1* | 3/2015 | Burns | G06F 1/3234 | 713/320 |
| 2015/0134995 A1* | 5/2015 | Park | G06F 11/3058 | 713/340 |
| 2015/0185814 A1* | 7/2015 | Ping | G06F 1/206 | 713/323 |
| 2015/0346798 A1* | 12/2015 | Dongara | G06F 1/3206 | 713/320 |
| 2015/0347666 A1* | 12/2015 | Zhang | G06F 17/5081 | 716/109 |
| 2015/0363212 A1* | 12/2015 | Gupta | G06F 9/44505 | 713/100 |
| 2015/0365995 A1* | 12/2015 | Tabet | H04W 76/28 | 370/311 |
| 2016/0011914 A1* | 1/2016 | Bohn | G06F 9/5094 | 713/300 |
| 2016/0054775 A1* | 2/2016 | Rajappa | G06F 1/3203 | 713/320 |
| 2016/0092363 A1* | 3/2016 | Wang | G06F 11/3409 | 711/119 |
| 2016/0147290 A1* | 5/2016 | Williamson | G06F 1/3275 | 713/323 |
| 2016/0179110 A1* | 6/2016 | Rotem | G05F 1/10 | 327/538 |
| 2016/0266629 A1* | 9/2016 | Merrikh | G06F 1/28 | |
| 2016/0314229 A1* | 10/2016 | Bickford | G06F 17/5031 | |
| 2016/0378168 A1* | 12/2016 | Branover | G06F 1/3287 | 713/323 |
| 2017/0067656 A1* | 3/2017 | Guidetti | F16K 5/04 | |
| 2017/0089769 A1* | 3/2017 | Krishnaswamy | G01K 15/005 | |
| 2017/0109674 A1* | 4/2017 | Parvania | G05F 1/66 | |
| 2017/0160781 A1* | 6/2017 | Piga | G06F 1/3203 | |
| 2017/0285702 A1* | 10/2017 | Song | G06F 1/26 | |
| 2017/0371401 A1* | 12/2017 | Rotem | G06F 1/3296 | |
| 2018/0103088 A1* | 4/2018 | Blainey | H04L 67/1002 | |
| 2018/0181554 A1* | 6/2018 | Tian | H04L 67/02 | |
| 2018/0196490 A1* | 7/2018 | Ail | H02H 11/005 | |
| 2018/0284867 A1* | 10/2018 | YangGong | G06F 1/3206 | |
| 2018/0284877 A1* | 10/2018 | Klein | G06F 1/3296 | |
| 2019/0033931 A1* | 1/2019 | YangGong | G06F 1/324 | |

* cited by examiner

POWER MANAGEMENT IN AN INTEGRATED CIRCUIT

BACKGROUND

Technical Field

Embodiments disclosed herein relate to computing systems, and more particularly, to power management of computing systems.

Description of the Relevant Art

Computing systems typically include a number of interconnected integrated circuits. In some cases, the integrated circuits may include one or more processors or processors cores. The integrated circuits may also include memory circuits configured to store program instructions for execution by the processor or processor cores.

During operation, a processor or particular processor core may retrieve program instructions from a memory, and execute the retrieved instruction to perform a particular function or operation. As part of the execution of the program instructions, the processor or processor core may additionally retrieve data from the memory. Using the retrieved data, the processor or processor core may perform an operation, such as, e.g., multiplication, addition, or any suitable operation, to generate a result. The processor or processor core may then store (commonly referred to as "write") the result into the memory.

As a processor or processor core retrieves the program instructions, performs the operation, and the like, the processor or processor core draws current from a power supply to execute the particular task. The amount of current drawn from the power supply may be a function of a number of individual tasks the processor or processor core may be executing during a particular period of time. In some cases, a processor or processor core may draw current during period of time when the processor or processor core is not executing any tasks.

SUMMARY OF THE EMBODIMENTS

Various embodiments of a serial data system are disclosed. Broadly speaking, an apparatus and a method are contemplated, in which a controller may be configured to, in response to detecting a timing signal, determine a total power consumption for a plurality of processor clusters, each of which includes multiple processor cores. The controller may then determine at least one performance metric based user the total power consumption, and compare the performance metric to a respective limit of a plurality of limits. The controller may select a first new power state for a first processor cluster based upon a result of the comparison, where a power consumption associated with the first new power state is less than a current power consumption of the first processor cluster. The controller may further transition the first processor cluster to the new power state.

In one embodiment, the controller may select a second new power state for a second processor cluster based upon the results of the comparison, where a power consumption associated with the second new power state is greater than a current power consumption of the second processor cluster. The controller may transition the second processor cluster to the new power state.

In another non-limiting embodiment, the controller may determine a predicted power consumption using the first new power state. In response to a determination that the predicted power consumption is greater than a power threshold value, the controller may halt transition of the first processor cluster to the first new power state.

Figure 1:
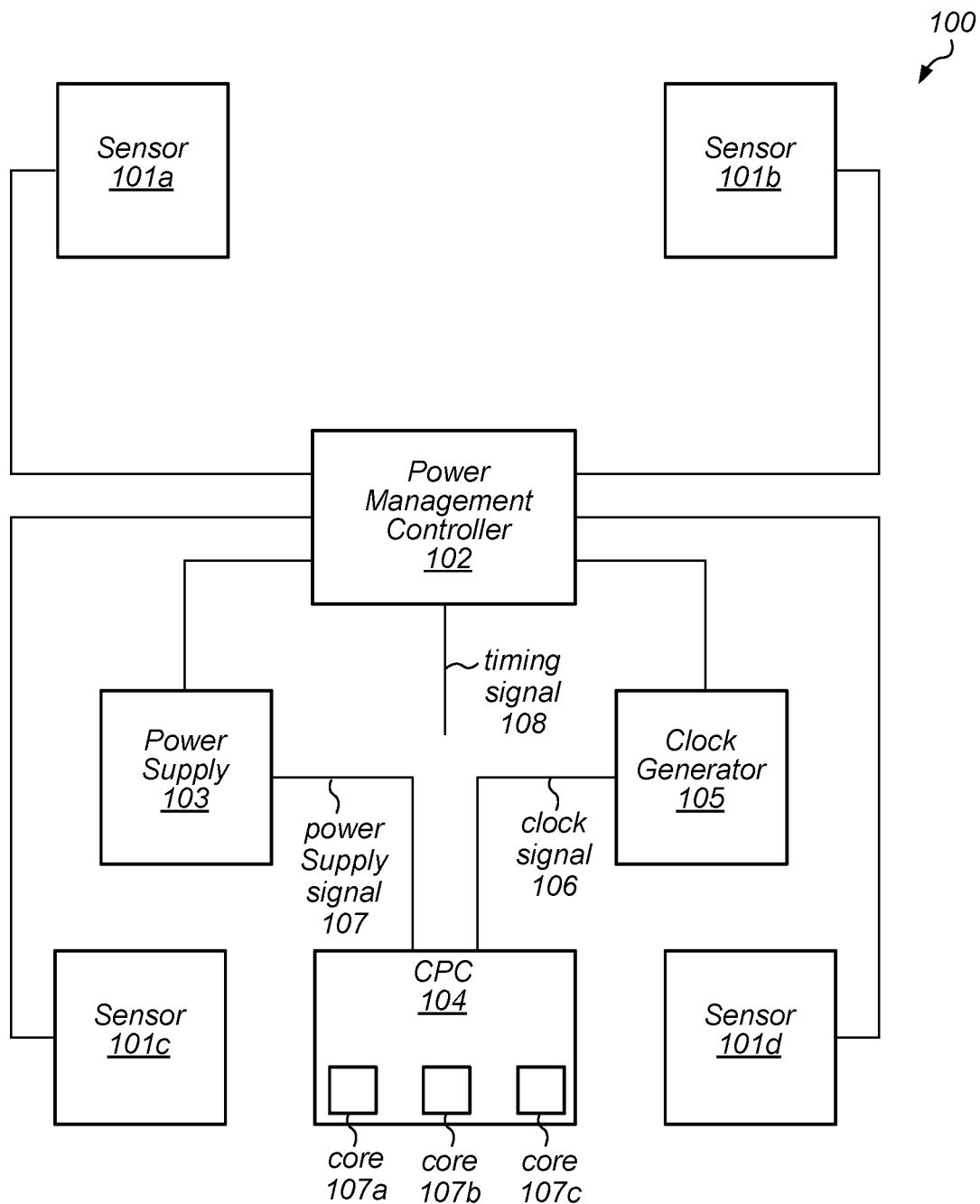
FIG. 1 is a generalized block diagram illustrating an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In some computing systems, power management controllers (PMCs) may be used to monitor power consumption of the computer system and make adjustments to the computing system or subsystems of the computing system to meet power consumption goals. Significant resources, both development time and manpower, may be consumed during the design of a PMC for a particular computing system or integrated circuit. A particular PMC design intended for a particular computing system or integrated circuit may not be compatible with other computing systems or integrated circuits, which may result in the use of additional resources to migrate the PMC to other computing system architectures.

During operation of the computing system, the act of migrating from one power state to another may itself consume power, and there may be many such power state migrations. In some cases, when the power consumption of the computing system is similar using two power states, the computing system may oscillate between power states, consuming extra power. Also, in some cases, different limits on performance parameters may result in a PMC requesting multiple power state transitions for the computing system, which can generate additional power consumption. The embodiments illustrated in the drawings and described below may provide techniques for the configuration of a PMC to work with different system architectures, while limiting oscillations between power states, and allowing for multiple pending power state transitions.

An embodiment of a computing system is illustrated in FIG. 1. In the illustrated embodiment, computing system 100 includes sensors 101a-d, power management controller (PMC) 102, power supply 103, clock generator 105, and core processor cluster (CPC) 104.

As described below in more detail, PMC 102 may be configured to adjust the power state of a CPC include in computing system 100. PMC 102 may, in response to detection of timing signal 108, calculate a total power consumption of computing system 100. Using the total power consumption, performance metrics may be determined and compared to caps or limits. Based on the comparison, PMC 102 may adjust the power state of CPCs, such as, e.g., CPC 104, included in the computing system 100 to meet the particular caps and limits. Any suitable circuit block included in computing system 100 may generate timing signal 108. In some embodiments, PMC 102 may generate timing signal 108.

CPC 104 includes processor cores (or simply "cores") 107a-c. In various embodiments, cores 107a-c may be configured to execute instructions retrieved from memory (not shown) according to a particular instruction set architecture (ISA). In one embodiment, cores 107a-c may be configured to implement the SPARC® V9 ISA, although in other embodiments it is contemplated that any particular ISA may be employed, such as x86, PowerPC® or MIPS®, for example.

In the illustrated embodiment, some of cores 107a-c may be configured to operate independently of the others, such that all cores 107a-c may execute in parallel. Additionally, in some embodiments each of cores 107a-c may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 107a-c may also be referred to as a multithreaded (MT) core.

Clock generator 105 is configured to generate clock signal 106, which is used as a timing reference for CPC 104. In various embodiments, clock generator 105 may include any suitable oscillator circuit, such as a crystal oscillator, for example. Clock generator 105 may also include one or more phase-locked loop (PLL) or delay-locked loop (DLL) circuit configured to generate a clock signal at a particular frequency. Based on input from PMC 102, clock generator may adjust a frequency of clock signal 106 as part of migrating the power state of CPC 104. Although clock generator 105 is depicted as generating a single clock signal, in other embodiments, clock generator 105 may be configured to generate multiple clock signals.

Power supply 103 includes, in various embodiments, regulator circuits or other suitable circuits configured to generate power supply voltage signals, such as power supply signal 107, for example. In some embodiments, power supply 103 may include a buck regulator configured to generate a supply voltage at a different voltage level than a primary power supply. Although only a single power supply circuit is depicted in the embodiment of FIG. 1, in other embodiments, multiple power supply circuits, each providing different power supply voltage signals, may be employed. Multiple circuit blocks, such as, e.g., CPC 104, may be coupled to a common power supply signal. In such situations, the multiple circuit blocks are referred to as being in the same "power domain" or "voltage domain."

Sensors 101a-d may, in various embodiments, include any suitable circuit for detecting data indicative of a particular performance metric. For example, sensors 101a-d may include thermometers or other temperature sensing circuits. In other embodiments, sensors 101a-d may include current and or voltage monitors. Although depicted as being individual circuit blocks in the embodiment of FIG. 1, in other embodiments, any of sensors 101a-d may be included in other circuit blocks, such as CPC 104, for example.

It is noted that the embodiment depicted in the block diagram of FIG. 1 is merely an example. In other embodiments, different circuit blocks and different configurations of circuit blocks may be employed.

Figure 2:
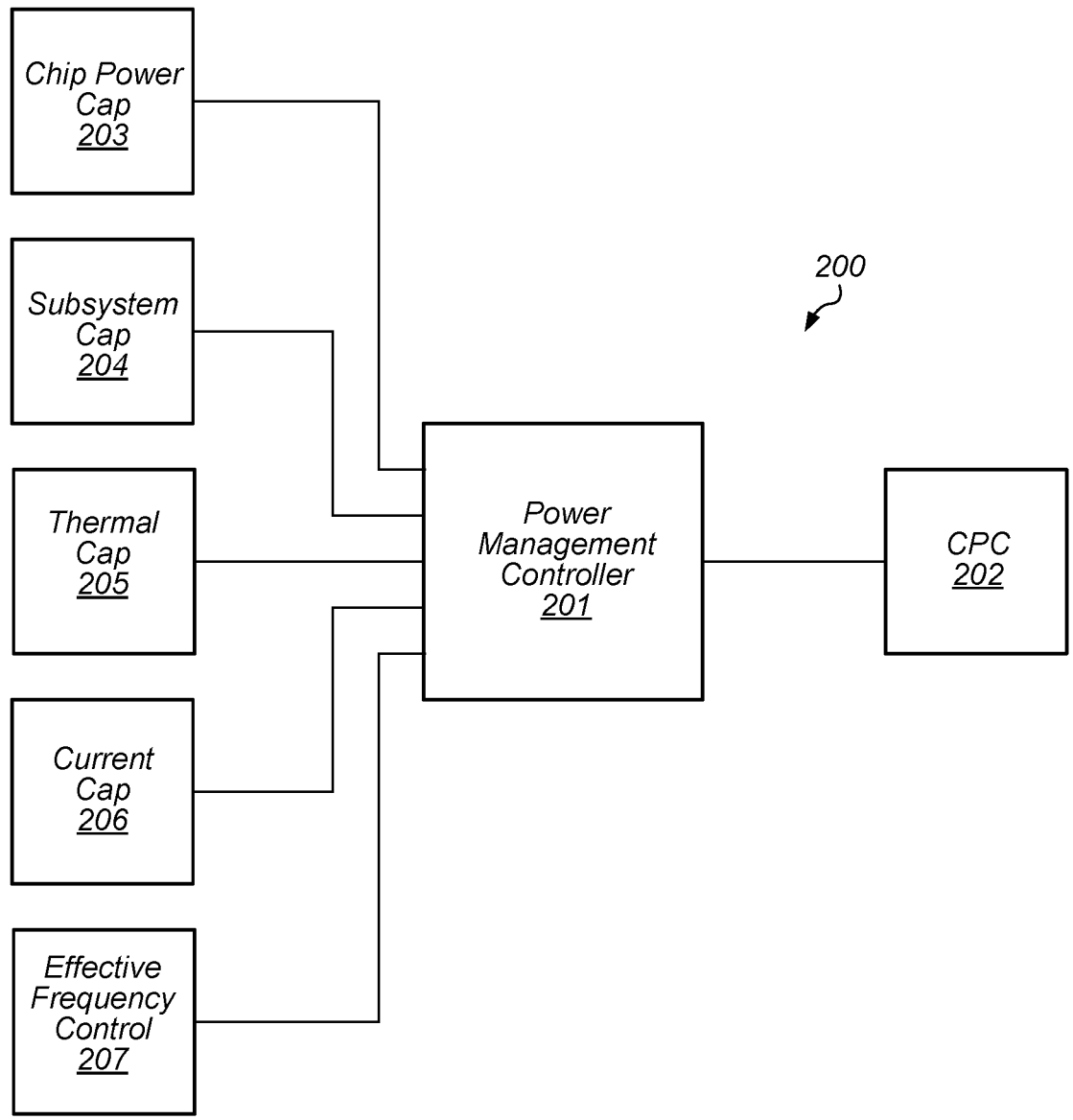
FIG. 2 is a generalized block diagram illustrating an embodiment of a power management control block.

Turning to FIG. 2, a block diagram depicting the operation of a power management controller is illustrated. In the illustrated embodiment, system 200 includes PMC 201, CPC 202, chip power cap 203, subsystem cap 204, thermal cap 205, current cap 206, and effective frequency control 207. In various embodiments, PMC 201 may correspond to PMC 102 of FIG. 1, and CPC 202 may correspond to CPC 104 of the embodiment depicted in FIG. 1.

As described below in more detail, during operation, PMC 201 may calculate a total power consumption for an integrated circuit or computing system in response to detecting a heartbeat or timing signal. Using the calculated total power consumption, PMC 201 may determine one or more performance metrics of the integrated circuit or computing system. For example, PMC 201 may determine a total amount of current being drawn from the power supply based on the total power consumption.

PMC 201 may then compare a determined performance metric to a corresponding cap or limit. Continuing with the above example, PMC 201 may compare the total amount of current being drawing from the power supply to current cap 206. In other embodiments, multiple performance metrics may be compared to respective caps. As described below in more detail, the caps may be stored in a register or other suitable storage location included in the integrated circuit or computing system. In some embodiments, the caps may be set to initial values during initialization of PMC 201. During operation, the values of the caps may be updated or modified based upon system performance, environmental changes, user input, or any other suitable stimulus. By storing the caps in a register that may be changed via software, a PMC design may be used across multiple integrated circuits and computing systems without extensive re-design.

Based on the comparison of at least one performance metric with its corresponding cap, PMC 201 may determine a new power state for one or more of CPCs included in the integrated circuit or computing system. As described below in more detail, the new power state may include a different supply voltage level, a different clock frequency, or any other suitable variation in operation parameters that affect power consumption. In some cases, the new power state for a CPC may cause the CPC to consume less power than the CPC is currently consuming (commonly referred to as "throttling"). As the total power consumption changes within the integrated circuit or computing system, PMC 201 may allow a CPC to transition to a power state that causes the CPC to consume more power than its current power state (commonly referred to as "resuming") in order to improve performance at the expense of power.

A comparison between a performance metric and a corresponding cap or limit may result in a power state change that is applied either globally or at some particular scope of the integrated circuit or computing system. Table 1 illustrates the scope of the caps depicted in the embodiment of FIG. 2. It is noted that the caps depicted in the embodiment of FIG. 2 are merely examples, and that different numbers of caps and different scopes of the caps are possible and contemplated.

TABLE 1

Example Cap Scopes for a Particular Embodiment

| cap name | Definition | Scope |
| --- | --- | --- |
| chip power cap 203 | Ensure that integrated circuit or computing system power is less than a predefined limit. | Global scope. Changes are dispatched to CPCs based on a round robin policy. |
| current cap 206 | Ensure that current drawn from a voltage regulator module is less than a predefined limit. | Voltage partition scope. Changes are dispatched to CPCs within the same power domain based on a round robin policy. |
| thermal cap 205 | Ensure the temperature of the integrated circuit or computing system is less than a predefined limit. | Local scope and voltage partition scope. Changes are dispatched to individual CPCs that violate the predefined limit. |
| subsystem cap 204 | Ensure that managed system power consumption is less that a predefined limit, | Global scope. Changes are dispatched to CPCs based on a round robin policy. |
| effective frequency control 207 | Ensures that individual CPCs operate no faster that a predefined limit. | Local scope. Changes are dispatched to individual CPCs. |

During operation, individual CPCs may have multiple power state transitions pending at any particular time. In some cases, PMC 201 may hold transitions to higher power states until predetermined conditions, such as, e.g., lower total power consumption, have been achieved. As described below in more detail, PMC 201 may merge multiple power state transitions into a single transition to a merged power state containing the elements of the pending power states. In various embodiments, PMC 201 may predict performance, as described below in more detail, based on a new power state for a CPC prior to transitioning the CPC to the new power state, to prevent undesirable transitions between power states.

It is noted that the embodiment depicted in FIG. 2 is merely an example. In other embodiments, different numbers of caps and different types of caps may be employed.

Figure 3:
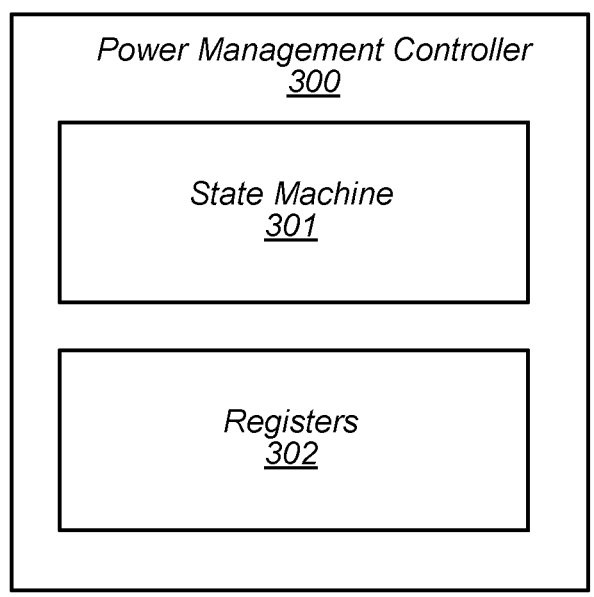
FIG. 3 illustrates a block diagram depicting an embodiment of a power management controller.

A PMC, such as, e.g, PMC 102, may be implemented according to various design styles. For example, in some cases, a PMC may be a general-purpose processor or processor core, executing multiple program instructions retrieved from memory. Alternatively, a PMC may be a dedicated circuit included within a computing system. An example of a particular embodiment of such a PMC circuit is illustrated in FIG. 3.

In the illustrated embodiment, PMC 300 includes state machine 301 and registers 302. In various embodiments, PMC 300 may correspond to either of PMC 102 or PMC 201 as depicted in the embodiments of FIG. 1 and FIG. 2, respectively.

State machine 301 may be configured to transition through various logical states based on the a total power consumption of the CPCs included in the computing system. For example, one case may correspond to PMC 300 waiting for the occurrence of a timing or heartbeat signal, and another logical state may correspond to selecting a new power state for a particular CPC of the computing system. Transitions between the various logical states may be triggered by various events that occur within the computing system, such as, detecting a timing or heartbeat signal, for example.

State machine 301 may be designed according to one of various design styles. For example, state machine may include multiple sequential logic circuits, each include multiple latches or flip-flop circuits. Such latch and flip-flop circuits may be configured to store one or more data bits, which considered collectively, represent a particular one of the various logical states that state machine 301 may hold.

Registers 302 may, in various embodiments, be configured to store limits (also referred to herein as "caps") for various performance metrics. For example, registers 302 may store values for chip power cap 203, subsystem cap 204, thermal cap 205, and the like. During initialization of PMC 300, registers 302 may be preloaded with various values, such as, the aforementioned cap values, for example.

Registers 302 may be designed according to one of various design styles. For example, registers 302 may include multiple latch or flip-flop circuits, each of which is configured to store a respective data bit of a multi-bit digital data word. In various embodiments, such latches or flip-flops may be either static circuits, dynamic circuits, or any suitable combination thereof.

It is noted that the embodiment illustrated in FIG. 3 is merely an example. In other embodiments, different circuit blocks and different arrangement of circuit blocks may be employed as part of a PMC.

Figure 4:
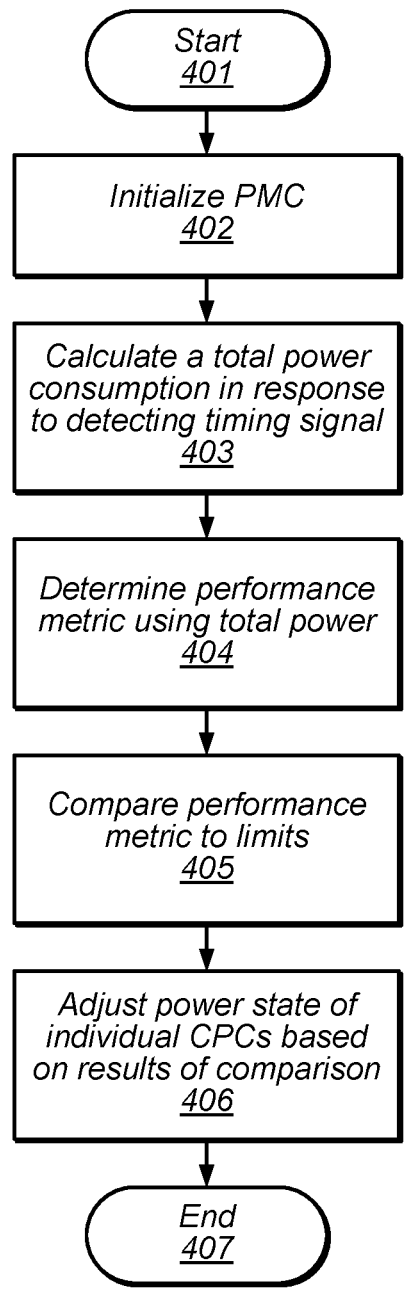
FIG. 4 illustrates a flow diagram depicting an embodiment of a method for operating a power management controller.

Turning to FIG. 4, a flow diagram illustrating an embodiment of a method for operating a PMC, such as, e.g., PMC 102, is depicted. Referring collectively to the embodiment of FIG. 1 and the flow diagram illustrated in FIG. 4, the method begins in block 401.

PMC 102 may then be initialized (block 402). In various embodiments, the initialization of PMC 102 may include pre-setting or clearing one or more of registers 302. Additionally, state machine 301 may be reset or driven into an initial state of the possible states available to state machine 301.

In response to receiving a timing signal, a total power consumption may then be calculated (block 403). In some embodiments, the total power consumption may be based on the power consumption of individual CPCs, such as CPC 104, for example. In various embodiments, the power consumption of individual CPCs may be determined based on measured current consumption. Alternatively, in other embodiments, the power consumption of an individual CPC may be determined by PMC 102 based on the number and type of instructions executed during a period of time. In some cases, an estimate of leakage current may be used in conjunction with the power consumption calculated based on instruction execution.

A performance metric may then be determined based on the total power consumption (block 404). As used and described herein, a performance metric is a value indicative of a particular aspect of the operation of a computing system. For example, performance metrics may include the total power consumption, the power consumption of a particular subsystem of the computing system, the current consumption of the computing system, and the like. In some embodiments, additional information, such as, e.g., temperature, may be used in the determination of the performance metric. It is noted that although a single performance metric is described above, in other embodiments, multiple performance metrics may be determined.

PMC 102 may then compare the performance metrics to respective limits (block 405). In various embodiments, the limits may be stored in registers 303 or any other suitable location. The limits may be set during the aforementioned initialization process. In some cases, the limits may be adjusted during operation of the computing system based on system performance, changes in environmental conditions, or any other suitable criteria.

Based on results of the comparison, the power state of individual CPCs may be adjusted (block 406). As used and described herein a power state for a CPC is collection of values for operational parameters governing the operation of the CPC. For example, a power state may include values for clock frequency, power supply voltage, cycle skipping, and the like. As described below, PMC 102 may adjust the power states for individual CPCs, or collectively adjust the power states for all of the CPCs based upon results of comparing specific performance metrics to their respective limits.

Once the power state(s) have been adjusted, the method may conclude in block 407. It is noted that the embodiment of the method depicted in the flow diagram of FIG. 4 is merely an example. In other embodiments, different operations and different orders of operations may be employed.

Figure 5:
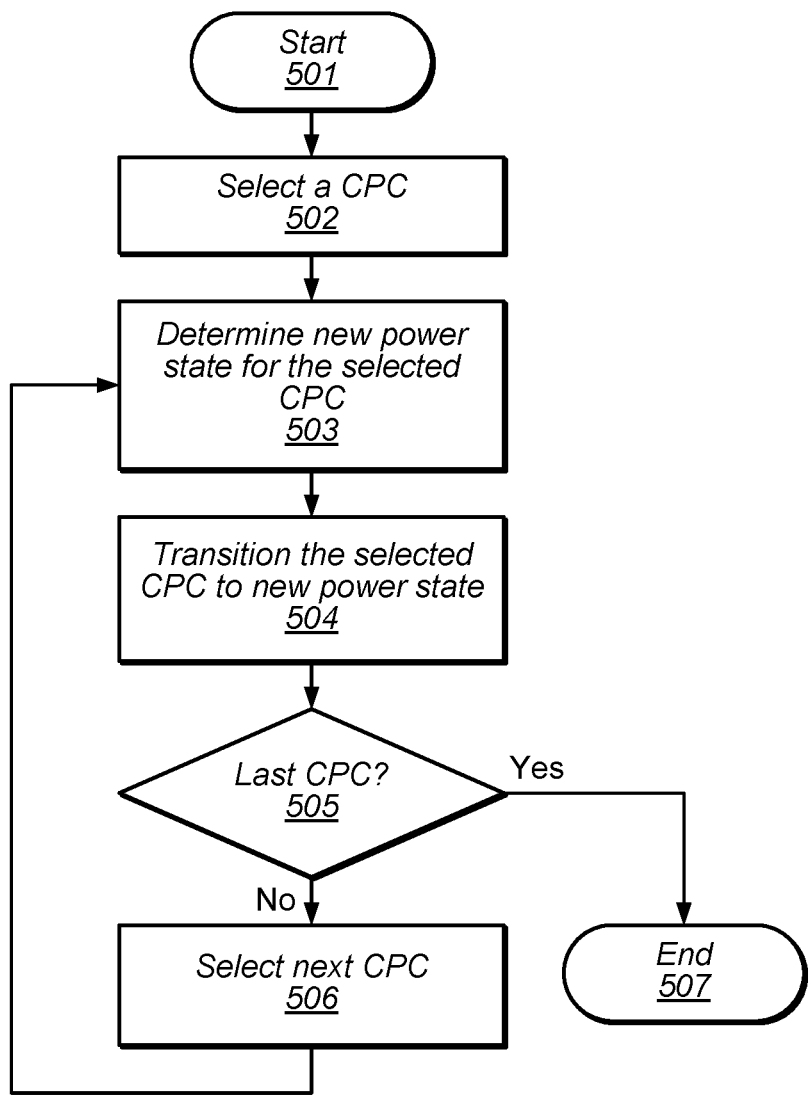
FIG. 5 illustrates a flow diagram depicting an embodiment of a method for adjusting the power state of a core power cluster.

Turning to FIG. 5, a flow diagram depicting an embodiment of a method for adjusting the power state of CPCs in computing system is illustrated. In some embodiments, the flow diagram of FIG. 5 may correspond to block 406 of the flow diagram illustrated in FIG. 4. Referring collectively to the embodiment of FIG. 1, and the flow diagram of FIG. 5, the method begins in block 501.

PMC 102 may then select a particular CPC, such as, CPC 104, for example (block 502). The selection may be performed using any suitable algorithm, such as a round robin algorithm, for example.

A new power state may then be determined for the selected CPC (block 503). In various embodiments, the new power state for the selected CPC may be based on results of comparing the determined performance metrics to the respective limits. The results of the comparison may be applied in different ways to different CPCs. For example, a violation of some performance metrics may result in new power states applied globally for each CPC in the computing system, while a violation of other performance metrics may result in new power states for a single CPC, or a proper subset of the CPCs included in the computing system. In some cases, multiple new power states may be possible for a particular CPC.

Once a new power state has been determined for the selected CPC, PMC 102 may transition the selected CPC to the new power state (block 504). As described below in more detail, additional checks may be performed before the selected CPC is transitioned to the new power state. In some embodiments, PMC 102 may instruct power supply 103 to reduce a voltage level or power supply 107 as part of transitioning CPC 104 to a new power state. Alternatively, or in addition to, PMC 102 may instruct clock generator 105 to reduce a frequency of clock signal 106, thereby decreasing the operating frequency of CPC 104. In some embodiments, PMC 102 may instruct to CPC 104 to initiate cycle skipping. As used and described herein, cycle skipping refers to a mode of operation of a processor or processor core, in which operations are halted (or "skipped") for a number of processor cycles during a period of time. The period of time may, in some embodiments, be designated by a number of processor cycles. The method may then depend on a number of CPCs left to analyze (block 505).

If the currently selected CPC is not the last CPC to be analyzed, then a next CPC is selected (block 506), and the method may continue from block 503 as described above. Alternatively, the currently selected CPC is the last CPC to analyze, then the method may conclude in block 507.

It is noted that the embodiment of the method illustrated in FIG. 5 is merely an example. In other embodiments, different operations and different orders of operations are possible and contemplated.

Figure 6:
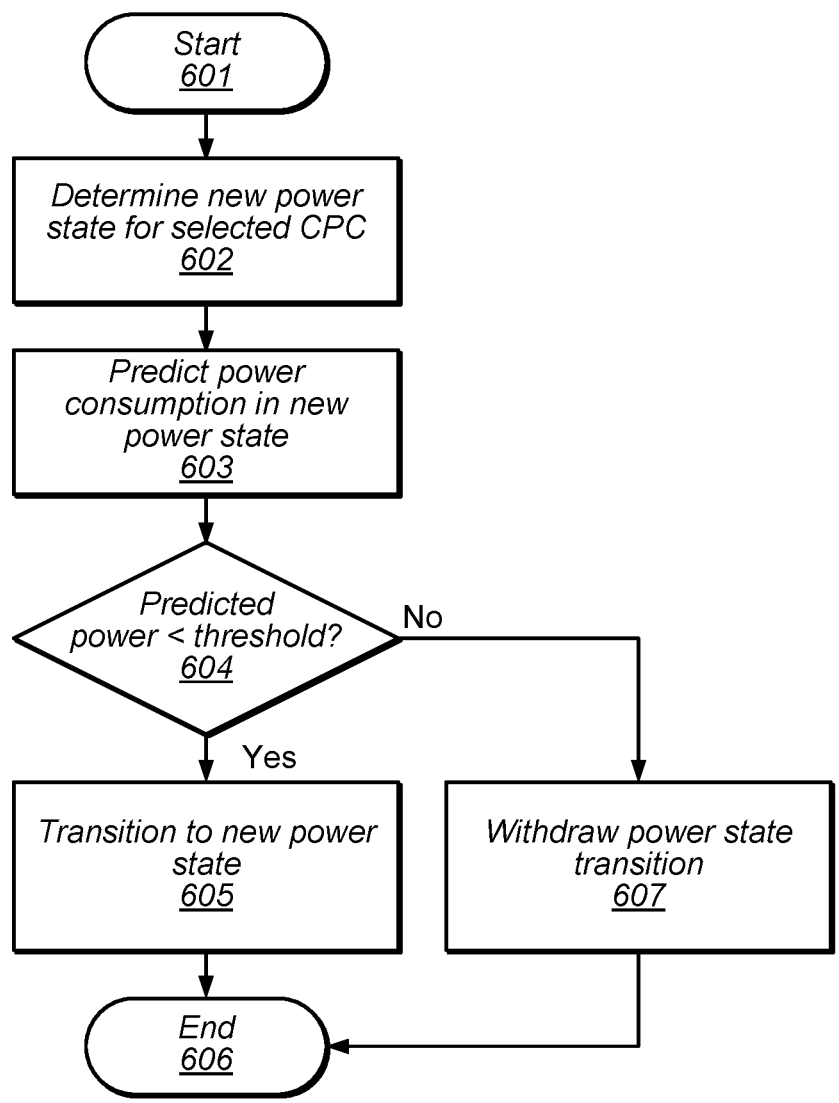
FIG. 6 illustrates a flow diagram depicting an embodiment of a method for transitioning to a new power state for a core power cluster.

Before transitioning a CPC into a new power state, a PMC may check to see if the new power state results in a lower power consumption by the CPC. A flow diagram depicting an embodiment of a method for making such a determination is illustrated in FIG. 6. In various embodiments, the method depicted in the flow diagram of FIG. 6 may correspond to at least a portion of block 504 of the flow diagram illustrated in FIG. 5. The method begins in block 601.

As described above, a new power state may be determined for a selected CPC (block 602). Using system settings included in the new power state, a PMC, such as, e.g., PMC 201, may predict the power consumption in either the selected CPC and/or the overall system (block 603). In various embodiments, the PMC may predict the power consumption of the selected CPC using estimates of levels of activity within the CPC based upon the system settings, as well as estimates of leakage power based on the voltage level of the power supply. The method may then depend on a comparison of the predicted power consumption and a programmable threshold (block 604). In some cases, the predicted power consumption of the selected CPC may be compared to a particular threshold value, while the overall system power may be compared to another threshold value. Such threshold values may, in some embodiments, be determined empirically to avoid oscillations between power states.

If the predicted power is less than the threshold value, then the PMC may transition the selected CPC to the new power state (block 605). The method may then conclude in block 606. Alternatively, the predicted power is greater than the threshold value, the transition of the selected CPC to the new power state may be withdrawn (block 607). The method may then conclude in block 606. By estimating the power consumption based on the new power state, the PMC may avoid transitions back and forth between power states, which may consume extra power resulting from the transitions themselves.

It is noted that the embodiment of the method depicted in FIG. 6 is merely an example. In other embodiments, different operations and different orders of operations are possible and contemplated.

In some cases, when it is determined a power state of a particular CPC should be changed, a change in power state for the particular CPC may already be pending. When this occurs, the two power state changes may be merged into a single power state change. An embodiment of a method for dealing with a pending power state change is illustrated in the flow diagram of FIG. 7. The method begins in block 701.

A PMC, such as, e.g., PMC 201, may determine a new power state for a particular CPC included in an integrated circuit (block 702). In various embodiments, the PMC may check various performance metrics of the particular CPC, and based on a comparison of the performance metrics to respective limits, determine if a change in power state is necessary, and how the power state change should be implemented. The method may then depend on whether there is another power state change in progress or pending for the particular CPC (block 703).

If there are no other power state changes in progress or pending, then the PMC may transition the power state of the particular CPC to the newly determined state (block 707). The method may then conclude in block 706.

Alternatively, if there is a power state change for the particular CPC currently in progress or pending, then a merged power state may be generated (block 704). In various embodiments, features of both the newly determined power state, and the currently pending power state may be jointly included in the merged power state. For example, if the newly determined power state includes a reduction in clock frequency, and the power state to which the particular CPC is being transitioned (or is currently pending) includes cycle skipping, both the reduction in clock frequency and cycle skipping may be included in the merged power state.

Once the merged power state is determined, the PMC may transition the power state of the particular CPC to the merged power state (block 705). With the transition of the power state of the particular CPC to the merged power state, the method may conclude in block 706.

Figure 7:
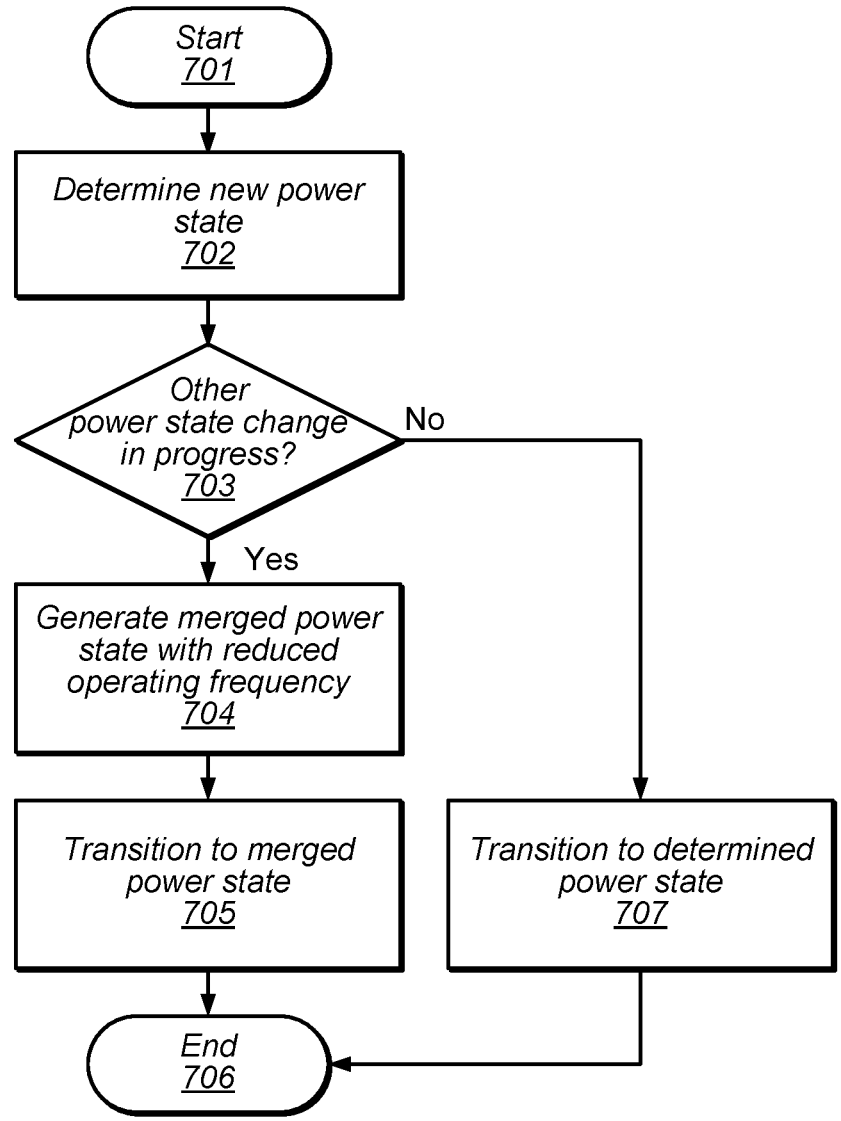
FIG. 7 illustrates a flow diagram depicting an embodiment of a method for transitioning a core power cluster to a new power state when a power state transition is in progress.

Although the operations are depicted as being performed in a serial fashion in the embodiment of FIG. 7, in other embodiments, one or more of the operations may be performed in parallel.

As described above, power management may be performed using a state machine or other dedicated hardware in a computing system. In some cases, some of the power management functions may be performed using program instructions executed by a general-purpose processor or other suitable processing hardware. Such program instructions may be a dedicated software program or application, or may be executed as part of another piece of system software.

Figure 8:
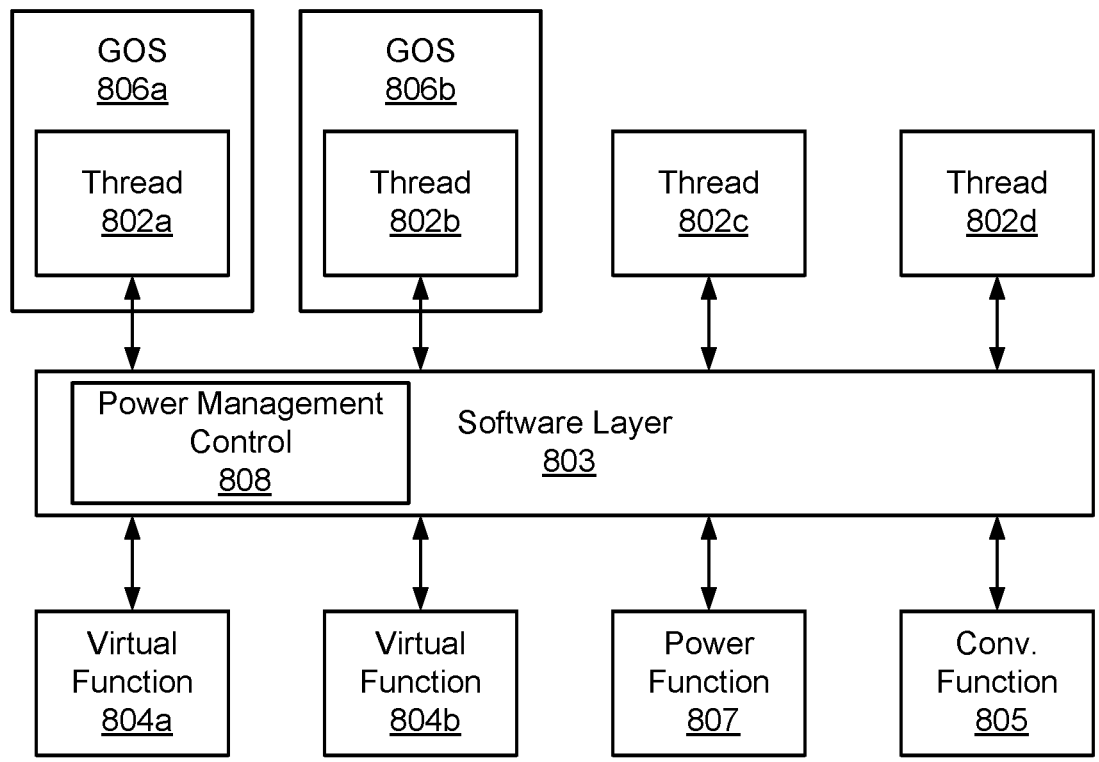
FIG. 8 is a block diagram illustration an implementation of power management control functions.

Turning to FIG. 8, a block diagram illustrating power management of a computing system is depicted. In the illustrated embodiment, execution threads 802a-d communicate with software layer 803. In turn, software layer 803 communicates with virtual functions 804a-b, conventional function 805, and power function 807. In various embodiments, virtual functions 804a-b, conventional function 805, and power function 807 may be included in the functionality of devices included in a CPC, such as core 107a-c as illustrated in FIG. 1, for example.

Software layer 803 (also referred to herein as a "hypervisor layer") may, in various embodiments, map access requests from execution thread 802a to virtual function 804a. In a similar fashion, access requests associated with execution thread 802b may be mapped to virtual function 804b, and execution thread 802c may be mapped to virtual function 804b. Additionally, execution thread 802d may be mapped to conventional function 805. Thread 802a is utilized by guest operating system (GOS) 806a, and execution thread 802b is utilized GOS 806b. Since each of execution threads 802a and 802b are employed by different GOS instances, the hardware resources shared between the two GOS instances.

In addition to performing the mapping of requests to functions, power management control 808, included in software layer 803, may monitor power consumption of individual CPCs included in the computing system. Based on the power consumption of the CPCs, power management control 808 may change the power state of particular CPCs using power function 807. In various embodiments, power function 807 may set power supply voltage levels, clock frequencies, cycle skipping, or any other suitable operational parameter that may modify the power consumption of a CPC.

It is noted that although only two threads included in two respective GOS are depicted in the embodiment illustrated in FIG. 8, in other embodiments, any suitable number of execution threads and GOS instances may be employed.

Figure 9:
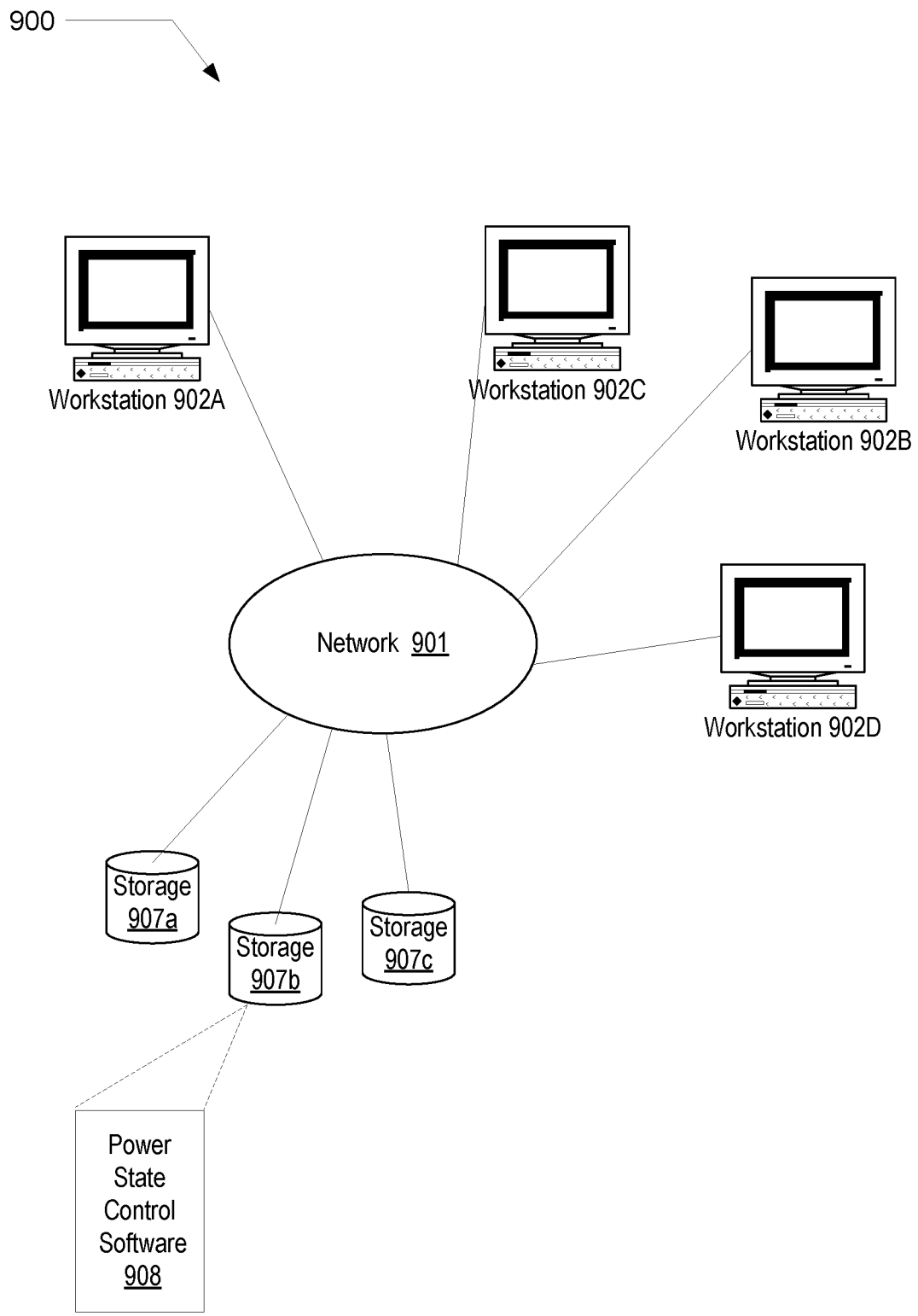
FIG. 9 is a block diagram of a computing system.

Turning to FIG. 9, a block diagram of one embodiment of a computer system including a resource limiter. The computer system 900 includes a plurality of workstations designated 902A through 902D. The workstations are coupled together through a network 901 and to a plurality of storages designated 907A through 907C. In one embodiment, each of workstations 902A-902D may be representative of any standalone computing platform that may include, for example, one or more processors, local system memory including any type of random access memory (RAM) device, monitor, input output (I/O) means such as a network connection, mouse, keyboard, and the like (many of which are not shown for simplicity).

In one embodiment, storages 907A-907C may be representative of any type of mass storage device such as hard disk systems, optical media drives, tape drives, ram disk storage, and the like. As such, program instructions included in the power management controller may be stored within any of storages 907A-907C and loaded into the local system memory of any of the workstations during execution. As an example, as shown in FIG. 9, the power management controller software 908 is shown stored within storage 907B.

In one embodiment, power management controller software 908 may be called by any of workstations 902A-902D. The program instructions associated with power management controller software 908 may be executed directly from the removable media or transferred to the local system memory or mass storages 907 for subsequent execution. As such, the portable storage media, the local system memory, and the mass storages may be referred to as non-transitory computer readable storage mediums. The program instructions associated with power management controller software 908 may be executed by the one or more processors on a given workstation, or they may be executed in a distributed fashion among the workstations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
    a plurality of processor clusters, wherein a particular processor cluster of the plurality of processor clusters includes a plurality of processor cores; and
    a controller circuit configured to:
        in response to a detection of a particular signal, determine a respective power consumption for the particular processor cluster of a plurality of processor clusters to generate a power consumption for the plurality of processor clusters;
        determine at least one performance metric of a plurality of performance metrics using the power consumption for the plurality of processor clusters;
        perform a comparison of a particular performance metric of the plurality of performance metrics to a respective limit of a plurality of limits;
        determine a first candidate power state for the particular processor cluster of the plurality of processor clusters using a result of the comparison of the particular performance metric of the plurality of performance metrics;
        predict an estimate of power consumed by the particular processor cluster if it were operating in the first candidate power state;
        determine a predicted total power consumption of the plurality of processors clusters using the estimate of power consumed by the particular processor cluster; and
        transition the particular processor cluster to the first candidate power state in response to a determination that the predicted total power consumption is less than a threshold total power consumption.

2. The system of claim 1, wherein the controller circuit is further configured to:
    determine a second candidate power state for a different processor cluster of the plurality of processor clusters based on at least the result of the comparison of the particular performance metric of the plurality of performance metrics; and
    transition the different processor cluster of the plurality of processor clusters to the second candidate power state using another predicted total power consumption.

3. The system of claim 1, wherein to transition the particular processor cluster of the plurality of processor clusters to the first candidate power state, the controller circuit is further configured to halt the transition of the particular processor cluster of the plurality of processor clusters to the first candidate power state in response to a determination the predicted total power consumption is greater than a power threshold value.

4. The system of claim 1, wherein to transition the particular processor cluster of the plurality of processor clusters to the first candidate power state, the controller circuit is further configured to:
    check for pending power state changes for the particular processor cluster; and
    in response to a determination that a different power state change is pending, merge the first candidate power state with a different power state associated with the different power state change.

5. The system of claim 1, wherein a first clock frequency associated with the first candidate power state is less than a second clock frequency associated with a current power state of the particular processor cluster.

6. The system of claim 1, wherein a first number of cycles to skip within a predetermined number of cycles associated with the first candidate power state is greater than a second number of cycles to skip within the predetermined number of cycles associated with a current power state of the particular processor cluster.

7. A method, comprising:
    in response to detecting a particular signal, determining a total power consumption for an integrated circuit using at least a power consumption of a particular processor cluster of a plurality of processor clusters;
    determining at least one performance metric of a plurality of performance metrics using the total power consumption;
    comparing a particular performance metric of the plurality of performance metrics to a corresponding limit of a plurality of limits;
    determining a first candidate power state for a first processor cluster of the plurality of processor clusters using a result of comparing the particular performance metric of the plurality of performance metrics to the corresponding limit of the plurality of limits;
    predicting an estimate of power consumed by the particular processor cluster if it were operating in the first candidate power state;
    determining a predicted total power consumption of the plurality of processor clusters using the estimate of power consumed by the first processor cluster; and
    transitioning the first processor cluster to the first candidate power state in response to determining the predicted total power consumption is less than a threshold total power consumption.

8. The method of claim 7, further comprising:
    determining a second candidate power state for a second processor cluster of the plurality of processor clusters using the result of comparing the particular performance metric of the plurality of performance metrics to the corresponding limit of a plurality of limits; and
    transitioning the second processor cluster of the plurality of processor clusters to the second candidate power state using another predicted total power consumption based on the second processor cluster of the plurality of processor clusters operating in the second candidate power state.

9. The method of claim 7, wherein transitioning the first processor cluster of the plurality of processor clusters to the first candidate power state includes halting the transitioning the first processor cluster to the first candidate power state in response to determining the predicted total power consumption is greater than a power threshold value.

10. The method of claim 7, wherein transitioning the first processor cluster of the plurality of processor clusters to the first candidate power state includes:
    checking for pending power state changes for the first processor cluster; and
    in response to determining a different power state change is pending, merging the first candidate power state with a different power state associated with the different power state change.

11. The method of claim 7, wherein a first clock frequency associated with the first candidate power state is less than a second clock frequency associated with a current power state of the first processor cluster.

12. The method of claim 7, wherein a first number of cycles to skip within a predetermined number of cycles associated with the first candidate power state is greater than a second number of cycles to skip within the predetermined number of cycles associated with a current power state of the first processor cluster.

13. The method of claim 7, wherein the plurality of performance metrics includes a temperature of the integrated circuit.

14. A non-transitory computer-accessible storage medium having programming instructions stored therein that, in response to execution by a computer system, causes the computer system to perform operations comprising:
    in response to detecting a particular signal, determining a power consumption for an integrated circuit using at least a power consumption of a particular processor cluster of a plurality of processor clusters;
    determining at least one performance metric of a plurality of performance metrics using the power consumption of the integrated circuit;
    comparing a particular performance metric of the plurality of performance metrics to a corresponding limit of a plurality of limits;
    determining a first candidate power state for a first processor cluster of the plurality of processor clusters using a result of comparing the particular performance metric of the plurality of performance metrics to the corresponding limit of the plurality of limits;
    predicting an estimate of power consumed by the particular processor cluster if it were operating in the first candidate power state;
    determining a predicted total power consumption of the plurality of processor clusters using the estimate of power consumed by the first processor cluster; and
    transitioning the first processor cluster to the first candidate power state in response to determining that the predicted total power consumption is less than a threshold total power consumption.

15. The non-transitory computer-accessible storage medium of claim 14, wherein the operations performed by the computer system further comprise:
    determining a second candidate power state for a second processor cluster of the plurality of processor clusters sing the result of comparing the particular performance metric of the plurality of performance metrics to the corresponding limit of a plurality of limits; and
    transitioning the second processor cluster of the plurality of processor clusters to the second candidate power state using another predicted power consumption based on the second processor cluster of the plurality of processor clusters operating in the second candidate power state.

16. The non-transitory computer-accessible storage medium of claim 14, wherein transitioning the first processor cluster of the plurality of processor clusters to the first candidate power state includes halting the transitioning the first processor cluster to the first candidate power state in response to determining that the predicted total power consumption is greater than the threshold total power consumption.

17. The non-transitory computer-accessible storage medium of claim 14, wherein transitioning the first processor cluster of the plurality of processor clusters to the first candidate power state includes:
    checking for pending power state changes for the first processor cluster; and
    in response to determining a different power state change is pending, merging the first candidate power state with a different power state associated with the different power state change.

18. The non-transitory computer-accessible storage medium of claim 14, wherein a first clock frequency associated with the first candidate power state is less than a second clock frequency associated with a current power state of the first processor cluster.

19. The non-transitory computer-accessible storage medium of claim 14, wherein a first number of cycles to skip within a predetermined number of cycles associated with the first candidate power state is greater than a second number of cycles to skip within the predetermined number of cycles associated with a current power state of the first processor cluster.

20. The non-transitory computer-accessible storage medium of claim 14, wherein the plurality of performance metrics includes a temperature of the integrated circuit.

* * * * *